United States Patent Office 3,538,730
Patented Nov. 10, 1970

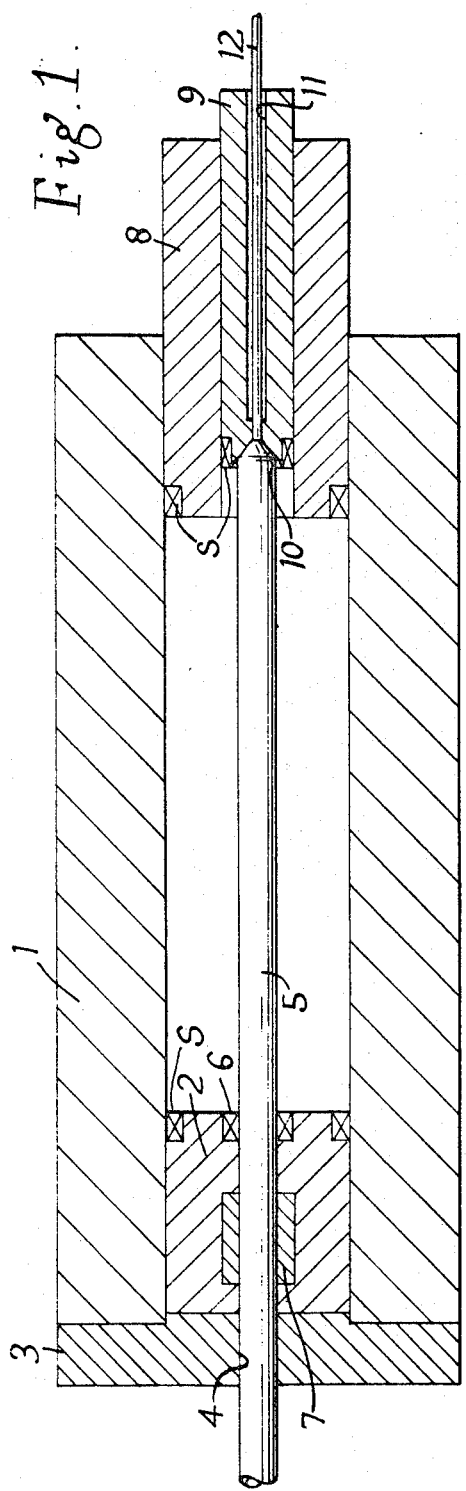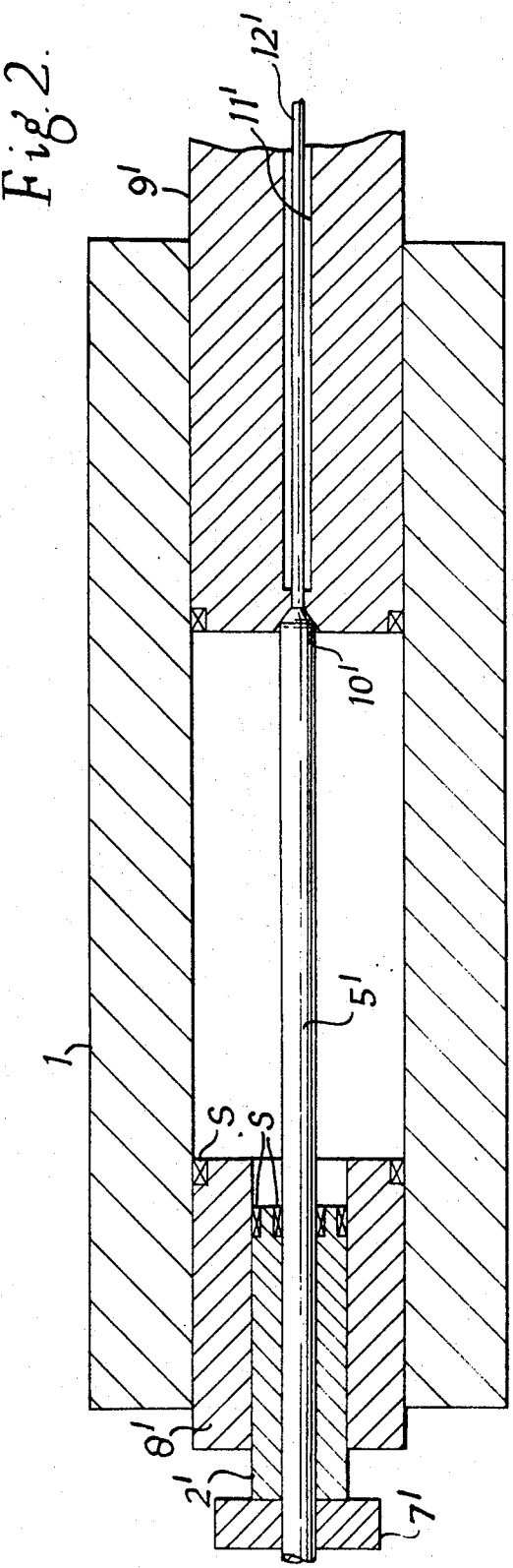

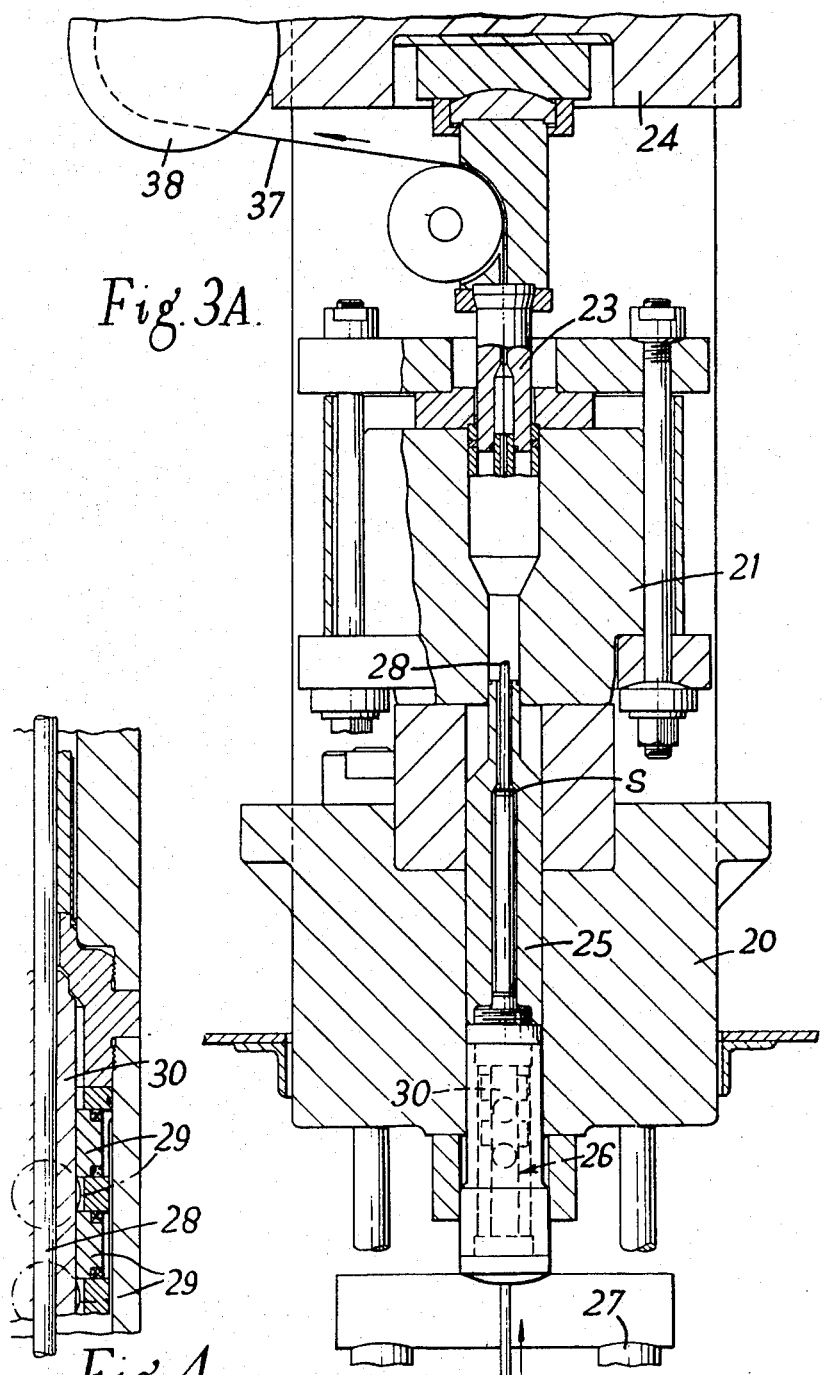

3,538,730
EXTRUSION METHOD AND APPARATUS
John Malcolm Alexander and Bela Lengyel, London, England, assignors to National Research Development Corporation, London, England
Filed Dec. 11, 1967, Ser. No. 689,637
Claims priority, application Great Britain, Dec. 15, 1966, 42,249/66
Int. Cl. B21c 23/08
U.S. Cl. 72—60                         5 Claims

ABSTRACT OF THE DISCLOSURE

Apparatus for the cyclic extrusion of a continuous length of feedstock billet comprising a high pressure chamber, an inlet with clamping and sealing means for the billet material, an extrusion die and outlet for the extrusion and means for cyclically developing high hydrostatic pressure within the chamber, has additional means such as an annular plunger surrounding the inlet or outlet for maintaining the pressure at a required value during relative movement of the inlet and extrusion die towards each other. This enables the feedstock billet and extrusion to extend along a straight line through the container.

---

The present invention relates to a method and apparatus for the cyclic hydrostatic extrusion of long billets and is concerned with improvements in and modifications of the invention forming the subject of our co-pending application No. 535,925 filed Mar. 21, 1966, now Pat. No. 3,465,625.

According to the present invention there is provided a cyclic method for the extrusion of a continuous billet by means of a pressure chamber filled with fluid, for convenience a liquid, and having an end wall formed with an inlet opening for the billet and an extrusion die forming an outlet from the chamber for the extrusion, a cycle of the said method comprising the steps of feeding a length of the billet into the chamber through the inlet while increasing the distance between the inlet and the die so that the billet extends undeformed through the chamber from the inlet to the die, increasing the pressure in the chamber to a high value insufficient to cause necking of the billet while gripping the billet with clamping means in the region of the inlet, forcibly reducing the distance between the clamping means and the extrusion die by relative movement therebetween while maintaining a pressure within the container which is sufficiently high to ensure that the billet extrudes through the extrusion die without buckling within the chamber but which is insufficient to cause necking of the billet, and thereafter reducing the pressure in preparation for the next cycle of the method.

In this way a straight billet may be extruded without the need for bending it within the container. This in turn enables the volume within the high pressure chamber to be greatly reduced.

The value of the high pressure which is maintained in the chamber during the extrusion of a length of the billet may be equal to or exceed the value required to extrude a short length of the billet having its trailing end within the container.

Alternatively a somewhat smaller pressure than that necessary for extrusion is first built up, which is then supplemented by an end force transmitted through the billet from the plunger to give the required extrusion pressure. Thus the actual extrusion may be effected by a combination of hydrostatic and conventional extrusion, henceforth called compound extrusion. In all cases, the pressure within the chamber must be sufficient to keep the said end force below the value which would cause the billet to buckle.

Conveniently, the inlet and the extrusion die may be carried in the two end walls of a cylindrical high pressure container. Relative movement between the clamping means and the die is then achieved by forming one end wall as a movable plunger. In this case, the high pressure is preferably introduced into the container at one end of the container rather than through the cylindrical wall so as to avoid non-uniform stresses and in particular tensile stresses in the wall which could give rise to fatigue problems. Advantageously the said high pressure is generated and controlled by an annular plunger surrounding either the inlet or die outlet portions of the billet path through the container. The movable plunger may be slidable within the annular plunger which is itself slidable in an end of the container or alternatively the annular plunger may surround a fixed plunger-like member carrying the clamping means or die, the other end of the container then being formed by the movable plunger. In order to maintain the required pressure within the chamber, it is then only necessary to apply a predetermined load on the said annular plunger while allowing it to move.

Alternatively, the said high pressure may be fed from an intensifier unit separate from the high pressure chamber, for example through a passage in one end of the container.

Embodiments of the invention will now be described by way of example with reference to the accompanying drawings, in which:

FIG. 1 is a diagrammatic axial section of one embodiment,

FIG. 2 is a corresponding view of another embodiment,

Figure 3B:
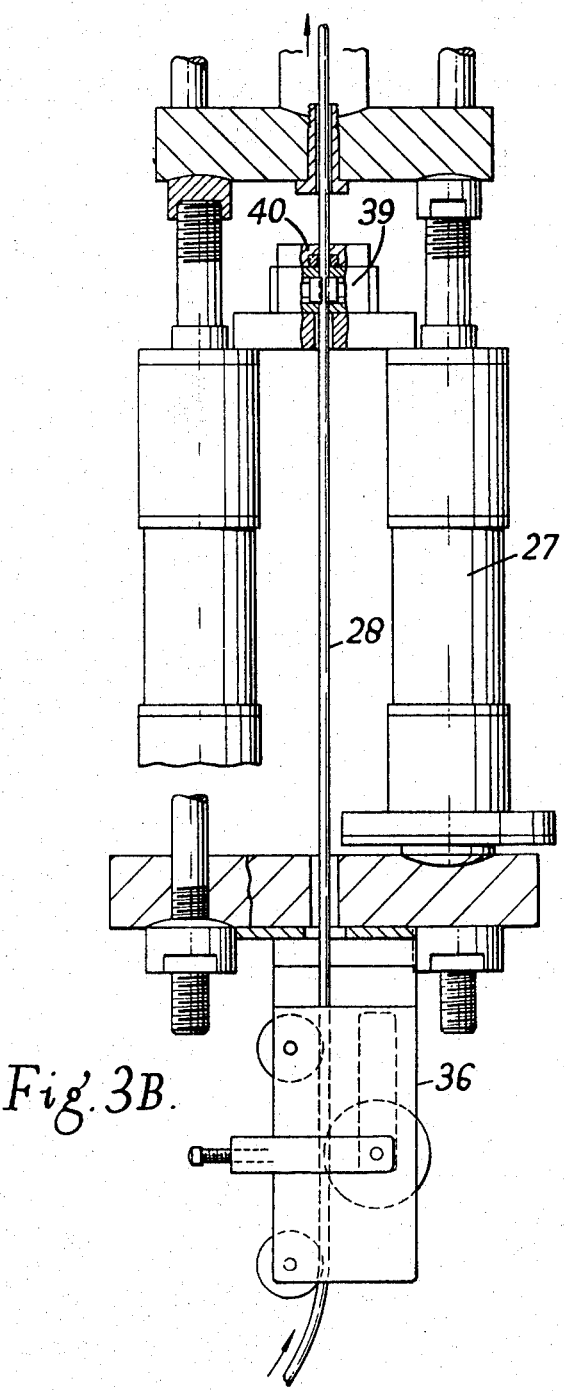
Figure 5:
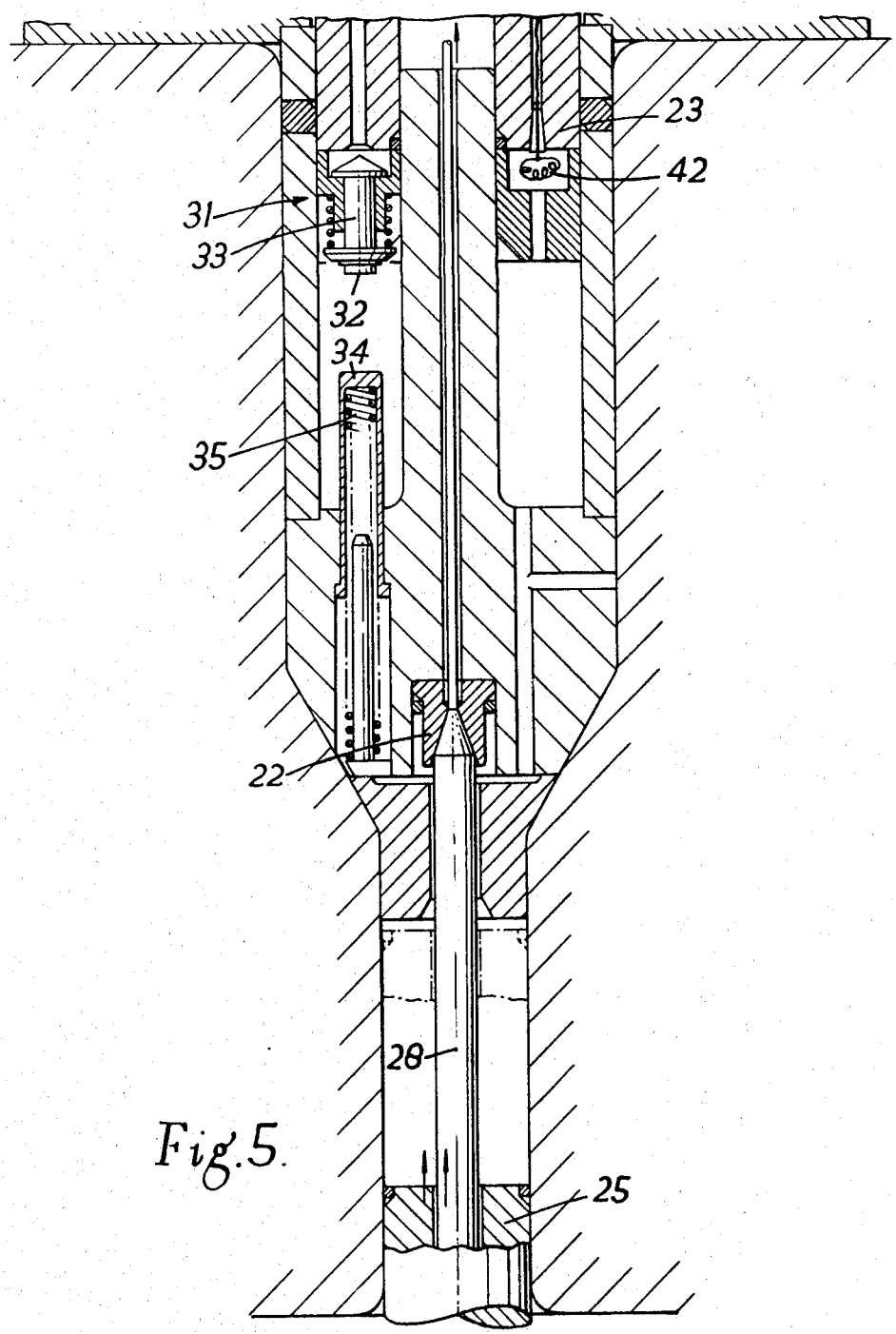
Figure 6:
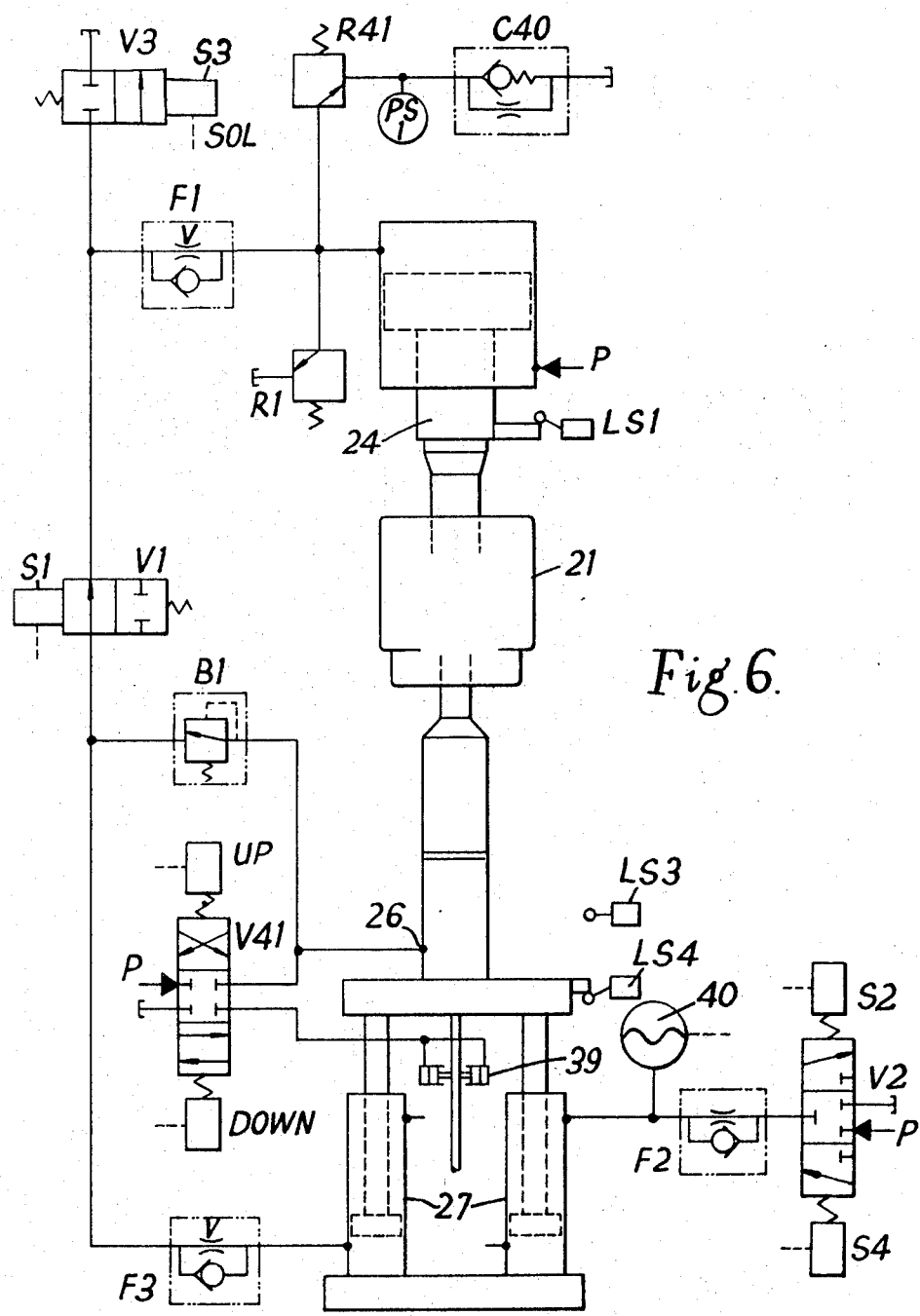

FIG. 3 is a vertical sectional view of a third embodiment, the upper half of the apparatus being shown in FIG. 3A and the lower half in FIG. 3B, FIG. 4 shows the clamping means of FIG. 3A on an enlarged scale, FIG. 5 shows on an enlarged scale parts of the die-carrying plunger and pressurising plunger for maintaining the predetermined pressure in the interior of the container, and FIG. 6 is a circuit diagram of the hydraulic connections and controls for the apparatus of FIGS. 3 to 5.

The extrusion apparatus shown in FIG. 1 comprises a cylindrical high pressure container 1 which may be formed from a single block of material or may be of complex constructions. One end of the bore in the container 1 is closed by an end wall 2 which is held in place by an end cap 3 secured to the container for example by tie rods. An inlet passage 4 for billet material in the form of a rod 5 extends through the end cap 3 and the end wall 2. Mounted in the end wall 4 are a high pressure seal 6 arranged to engage the rod 5 to prevent high pressure leaks from the interior of the container 1 and clamping means 7 for engaging the rod 5. Various forms of suitable clamping means are described in our co-pending applications Nos. 535,925 filed Mar. 21, 1966, and 660,056 filed Aug. 11, 1967.

Slidable in the other end of the container 1 is an annular plunger 8. A plunger 9 is in turn slidable in the interior of the plunger 8 and is formed with an extrusion die 10 leading into a die outlet passage 11 extending along the length of the plunger 9.

The end wall 2 and the plungers 8 and 9 carry high pressure seals S for preventing leaks from the container while permitting sliding movement of the plungers 8 and 9.

In operation the interior of the container 1 is filled with a liquid capable of withstanding high pressures and the leading edge of the rod 5 is tapered to conform to the interior of the die 10 and is fed into the container through the passage 4 until its leading edge is engaged in the die 10. The clamping means 7 are then engaged to grip the rod 5 and the plunger 8 is urged to the left so as to generate in the interior of the container 1 a predetermined high hydrostatic pressure. This pressure would be sufficient (or somewhat less for compound extrusion) to extrude the rod 5 through the die if the rod were cut off at some point along its unsupported length within the container so that the predetermined pressure could act on the left hand or trailing end surface of this cut off portion. The predetermined high pressure is however insufficient to cause necking of the rod which would result in a portion of the rod being extruded through the die and being broken off from the remainder of the rod.

Where the length of billet extending along the length of the container is sufficiently rigid to be capable of transmitting an appreciable axial force without buckling, the pressure maintained within the container during the extrusion step may be reduced if desired so as to effect compound extrusion, the pressure within the container being high enough to ensure that the axial load on the unsupported length of the billet is sufficiently small to prevent buckling of the billet.

The die plunger 9 is then forced to the left for example by an external ram or by mechanical means such as an eccentric and connecting rod mechanism. The pressure within the container 1 is maintained at its predetermined value and the reduction in the volume of the interior of the container 1 caused by the movement of the plunger 9 causes the rod material to be extruded through the die 10 to form the extrusion 12. Throughout the working stroke of the plunger 9, a substantially constant load is applied to the annular plunger 8. Since the cross sectional area of the plunger 9 is greater than that of the rod 5, the volume of liquid equal to the product of the distance moved by the plunger 9 and the difference in cross sectional areas of the plunger 9 and rod 5 is displaced and this is accommodated by the movement of the plunger 8 to the right (FIG. 1) against its substantially constant load. Thus the pressure within the container 1 is maintained throughout the extrusion stroke at a value sufficient to ensure extrusion through the die (or somewhat less for compound extrusion) but insufficient to cause necking of the rod 5, bearing in mind that the pressure required to cause necking is approximately equal to the sum of the pressure required to cause extrusion through the die 10 and the lateral pressure required to deform the rod.

When the plunger 9 has completed its extrusion stroke, the load acting on the annular plungers 8 and 9 is relieved and the clamp 7 is released. The plungers 8 and 9 are moved to the right to return to their original position and a corresponding further length of rod is fed in through the passage 4. The apparatus is then ready for the next extrusion cycle of the method.

In the embodiment shown in FIG. 2 the parts performing the same function as those of the embodiment shown in FIG. 1 are indicated by the same reference numerals primed. In this embodiment, the annular plunger 8' for maintaining the predetermined pressure in the interior of the container 1' surrounds a stationary end member 2' which carries the clamping means and is secured to the frame of the apparatus (not shown).

The die 10' is carried by a plunger 9' which is slidable in the other end of the container 1'.

The operation of the embodiment shown in FIG. 2 is the same as that of the embodiment shown in FIG. 1.

In a modification of the embodiment shown in FIG. 2, the plunger 9' carrying the extrusion die 10' may be kept substantially stationary. In this case, extrusion of the billet through the die 10' is effected by forcing the plunger 2' into the container, the clamping means 7' being moved with the plunger 2'. If desired, the feedstock 28 may be passed through a preliminary sizing die 40.

FIGS. 3 to 6 show an experimental apparatus constructed in accordance with this modification.

The experimental apparatus shown in FIGS. 3 to 6 is suitable for the extrusion of straight or bent feedstock, although only the former, and in particular for compound extrusion, will be described. The general arrangement has been determined by existing facilities, and by the limited capacity of the two opposing vertical rams of a 300 tons press. Consequently the "moving clamp" arrangement had to be employed with the feed and extrusion vertically upwards through a stationary die. Although initially 45 ton f./in.$^2$ extrusion pressure can be achieved, this will be increased in the further stages of development.

The container 21 is attached to the pressure bed 20 (FIG 3A), the extrusion die 22 (FIG. 5) being fixed to the container, centrally inside it. The top pressurising plunger 23 is attached to the press main ram 24; the lower feed plunger 25 and the clamp 26 are attached to an assembly of four feed rams 27 (FIG. 3B) which exert a combined thrust of 120 tons. The straight feedstock 28 is held in initial sealing contact with the die 22 by means of a moderate lifting force provided by a small check clamp 39 and by tension in the extruded wire.

The clamp 26 consists of several pairs of diametrically opposed hydraulic plungers 29, enclosed in a sealed feed thrust-tube, and acting upon four long clamp jaws 30.

Initially, the feed plunger 25 and the pressurising plunger 23 are retracted and the feedstock billet 28 is unclamped. The extrusion cycle begins with the clamping of the billet 28 and the lowering of the pressurising plunger 23.

The arrangement inside the container is shown in FIG. 5. A fluid-replenishing check valve 31 is sprung into the open position. As the pressurising plunger 23 is forced down by the press main ram 24, fluid is exhausted freely from the container past the valve 31 until, at a predetermined position, the end 32 of the valve member 33 contacts a resiliently supported thrust pin 34, which closes the valve 31 and stops the loss of fluid. With further pressurising plunger travel the pressure in the container rises and the thrust pin 34 is forced down against its own spring 35. The bottom, feed plunger 25 is held in its initial position by the feed rams 27, thus maintaining sealing contact between the feedstock 28 and the die 22.

As soon as the extrusion pressure is reached, i.e. that pressure at which the billet would start to extrude if it were not restrained, the feed plunger 25 is forced upwards and extrusion commences, the pressurising plunger 23 being gradually withdrawn to maintain a constant extrusion pressure. The feed plunger 25 is stopped after a predetermined stroke, and the container is then de-pressurised by withdrawing the pressurising plunger 23. Subsequently the feed plunger 25 is returned to its initial position and the container fluid is replenished through the check valve 31 to complete the cycle.

In this arrangement the press main ram 24, the feed rams 27 and the billet clamp 26 are operated by the same pumping system P (FIG. 6) through hydraulic/electrical controls. The feedstock is ½ inch diameter, and is drawn from a coil through an unpowered 3-roll straightening unit 36. The extruded wire 37 is wound on to an air-powered reeling unit 38 which incorporates a variable-ratio gearbox and stalls when the delivery of wire is interrupted.

The material is preferably extruded by the fluid pressure alone, the feed ram controling the extrusion speed by assisting or retarding the feedstock. Alternatively augmented or compound extrusion may be achieved by limiting the fluid pressure to a value less than the extrusion pressure, sufficient axial force being exerted on the feedstock through the feed rams to cause extrusion to take place.

The high pressure container is surrounded by a safety jacket 39.

The unit is arranged to run in continuous operation under the control of a conventional relay-type electrical system. FIG. 6 shows the diagrammatic arrangement of the hydraulic control valves and circuit which operate the various machine functions.

Usually the main ram 24 is controlled by solenoid-operated valve V41. When V41 is in the "UP" position, the ram 24 lifts by means of a permanent hydraulic pressure supply to the lifting annulus at P. When V41 is in the neutral position, the pressure supply to P is dumped to drain and the ram remains balanced by an adjustable check valve. The press ram can be cycled automatically between the "top reversal" limit switch LS1 and pressure switch PS1 which operates when the ram pressure reaches the value set by relief valve R41, or it can be controlled manually by electric pushbuttons (not shown).

The hydraulic supply P is at 4500 lbf./in.$^2$ with a delivery rate adjustable from zero to 70 gal./min. Switches LS3 and 4 are used to signal the top and bottom positions of the feed rams 27. The initial position is shown in FIG. 6, all valves then being in the positions shown and de-energised with the exception of V1 which is normally energised to the open position. The press ram 24 is fully up, the feed rams 27 are fully down, the clamping unit 26 is depressurised in the open position, and the check clamp 39 is pressurised having secured the feedstock during the previous withdrawal of the feed rams.

The cycle is started by energising V41 to the "DOWN" position, thereby initially supplying hydraulic fluid to the clamping unit 26, only the check clamp 39 being de-pressurised. When the pressure rises, by-pass valve B1 opens to admit oil simultaneously to the press ram 24 and to the feed rams 27 as well as to the clamping unit 26, the pressure rising simultaneously at each point.

The press ram 24 lowers to pressurise the extrusion container 21 by means of the top plunger 23, but the feed rams 27 cannot lift because V2 is in the neutral position blocking their exhaust. Two provisions have been made to ensure that the feedstock can neither be displaced to lose sealing contact in the die, nor sufficiently loaded axially to cause more than slight buckling. First, the area ratio of the thrust sides of the main and feed rams is slightly different from the area ratio of the top plunger and feed plunger plus feedstock; thus with the rams at the same pressure, a resultant upward force is produced which rises to a maximum of 14 tons at the full system pressure, this force being resisted by the blocked volume of oil on the return side of the feed rams. Secondly, to compensate for the displacement of the feed ram support under rising forces, and ensure that a seal is maintained in the extrusion die (possibly with minimal buckling of the feed-stock in the container), a very small extension of the feed ram is achieved during the pressure rise, by means of an air-filled presure accumulator 40.

The choice of exactly balanced area-ratios has been deliberately avoided since diametral errors and uncontrollable frictional forces could prevent the desired force equilibrium and cause either uncontrollable buckling of the feed stock or instability.

The hydraulic oil pressure rises proportionately with the pressure rise in the container fluid until the extrusion pressure is reached in the container. At this point relief valve R41 opens to maintain this pressure and also operate pressure switch PS1.

The signal from PS1 simultaneously de-energises S1 to close V1 and energises S2 on V2 to exhaust the feed rams. Consequently, the feed rams rise at a rate controlled by flow regulator F2, enabling the feed plunger to rise and allow the feedstock to extrude at a steady speed.

To prevent a pressure-rise in the container during the extrusion stroke, the upper plunger 23 lifts against the constant pressure on the press main ram, the oil being exhausted through relief valves R41 and R1.

At the end of the feed stroke, LS3 operates to energise S3 which, by opening V3, opens the thrust side of the main ram to exhaust. The main ram is lifted by pressure on the lift side of the ram at a rate controlled by F1 until LS1 operates.

The signal from LS1 energises the "UP" solenoid to reverse V41, thereby pressurising the feedstock check clamp and depressurising the main clamping unit.

After a brief electrically-timed delay, V2 is reversed to retract the feed rams, V1 being simultaneously energised to enable them to exhaust through V3 at a rate controlled by F3 until LS4 operates at the bottom of the stroke.

The signal from LS4 reverses V2 by pulsing S2 briefly so that the return side of the feed rams is de-pressurised. After this pulse V2 is de-energised to the neutral position, simultaneously de-energising V3 to the closed position and reversing V41 to the "DOWN" position thereby commencing the next cycle.

The pressure in the container 21 may be monitored by means of a manganin pressure coil 42 (FIG. 5). If desired, the feedstock 28 may be passed through a preliminary sizing die 40.

We claim:
1. Cyclic hydrostatic extrusion apparatus comprising
   a high pressure fluid container having a plain bore therein, the side wall of said bore being devoid of openings,
   a first end wall means closing one end of the bore, second and third wall means closing the other end of said bore, said third wall means extending around said second wall means, said second and third wall means being relatively movable in sealed relation, billet clamping and sealing means defining a billet inlet in one of said first and second wall means, an extrusion die defining an extrusion orifice in the other of said first and second wall means, first force-applying means for forcibly reducing the distance between said first and second wall means; and second force-applying means for forcibly reducing the distance between said first and third wall means.

2. The apparatus of claim 1 and including blocking means for blocking the operation of the first force-applying means until the second force applying means have generated a predetermined extrusion pressure within the container bore.

3. The apparatus of claim 2 in which said first and second force-applying means comprises first and second hydraulic ram means respectively and said first and second ram means are supplied with pressure fluid from a common source.

4. The apparatus of claim 3 in which the active area of said first ram means is slightly greater than the active area of said second ram means.

5. In the cyclic method for the extrusion of a continuous feedstock billet by means of a pressure chamber filled with fluid and having an end wall formed with an inlet opening for the billet, and an extrusion die forming an outlet from the chamber for the extrusion, in which a cycle of the said method includes the steps of increasing the distance between the inlet and the die as a new length of billet is fed along a substantially straight path into the chamber through the inlet, increasing the pressure in the chamber while gripping the billet with clamping means in the region of the inlet, forcibly reducing the distance between the clamping means and the extrusion die by relative movement therebetween while maintaining a high pressure within said chamber and thereafter reducing the pressure in preparation for the next cycle of the method, the improvement which comprises the step of increasing and controlling the high pressure in the chamber throughout the reduction of the distance between the clamping means and the extrusion die by increasing and controlling a force applied from the exterior of the chamber to a wall surface of the chamber which is movable independently of the inlet and extrusion die.

References Cited

UNITED STATES PATENTS

| | | | |
|---|---|---|---|
| 3,181,328 | 5/1965 | Zeitlin | 72—60 |
| 3,417,589 | 12/1968 | Bobrowsky | 72—60 |
| 3,423,983 | 1/1969 | Lees et al. | 72—60 |
| 3,434,320 | 3/1969 | Green | 72—60 |

RICHARD J. HERBST, Primary Examiner

U.S. Cl. X.R.

72—270

UNITED STATES PATENT OFFICE
CERTIFICATE OF CORRECTION

Patent No. 3,538,730   Dated November 10, 1970

Inventor(s) Alexander, John Malcolm and Lengyel, Bela

It is certified that error appears in the above-identified patent and that said Letters Patent are hereby corrected as shown below:

In the heading, at the top of column 1, after "Claims priority", please delete "application Great Britain, Dec. 15, 1966, 42,249/66" and substitute therefor: --applications Great Britain, 56241/66, filed December 15, 1966 and 41249/67, filed September 8, 1967 --.

Signed and sealed this 13th day of July 1971.

(SEAL)
Attest:

EDWARD M. FLETCHER, JR.
Attesting Officer

WILLIAM E. SCHUYLER, JR.
Commissioner of Patents